(12) United States Patent
Demorais et al.

(10) Patent No.: US 9,850,971 B1
(45) Date of Patent: Dec. 26, 2017

(54) DISK BRAKE PISTON

(71) Applicant: MANDO CORPORATION, Gyeonggi-do (KR)

(72) Inventors: Antonio Eduardo Demorais, South Lyon, MI (US); Daniel Alan Smith, Livonia, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/227,918

(22) Filed: Aug. 3, 2016

(51) Int. Cl.
| | |
|---|---|
| F16D 65/18 | (2006.01) |
| F16D 55/2265 | (2006.01) |
| F16D 55/00 | (2006.01) |
| F16D 123/00 | (2012.01) |
| F16D 121/04 | (2012.01) |
| F16D 121/24 | (2012.01) |
| F16D 125/40 | (2012.01) |
| F16D 125/06 | (2012.01) |

(52) U.S. Cl.
CPC .......... F16D 65/18 (2013.01); *F16D 55/2265* (2013.01); *F16D 2055/0066* (2013.01); *F16D 2121/04* (2013.01); *F16D 2121/24* (2013.01); *F16D 2123/00* (2013.01); *F16D 2125/06* (2013.01); *F16D 2125/40* (2013.01)

(58) Field of Classification Search
CPC ................. F16D 65/18; F16D 55/2265; F16D 2055/0066; F16D 2121/04; F16D 2121/24; F16D 2123/00; F16D 2125/06; F16D 2125/40

USPC ..................... 188/72.3, 72.8, 72.6
See application file for complete search history.

(56) References Cited

U.S. PATENT DOCUMENTS

| | | | |
|---|---|---|---|
| 2,926,757 A | 3/1960 | Armstrong et al. | |
| 4,193,179 A | 3/1980 | Confer et al. | |
| 5,105,917 A | 4/1992 | Sporzynski et al. | |
| 5,507,369 A | 4/1996 | Ferreira et al. | |
| 6,325,182 B1* | 12/2001 | Yamaguchi | B60T 13/741 188/162 |
| 6,367,592 B1* | 4/2002 | Kapaan | F16D 65/18 188/158 |
| 6,478,120 B2* | 11/2002 | Runkel | F16D 65/18 188/196 D |
| 6,481,543 B1 | 11/2002 | Shaw et al. | |
| 6,637,317 B1 | 10/2003 | Zeibig et al. | |
| 6,659,236 B1* | 12/2003 | Clark | F16D 65/18 188/196 V |
| 6,811,002 B2* | 11/2004 | Nakayama | F16D 65/18 188/71.9 |
| 7,434,669 B2* | 10/2008 | Halasy-Wimmer | F16D 65/18 188/158 |
| 7,565,953 B2* | 7/2009 | Dalton | B60T 13/746 188/1.11 E |
| 7,635,050 B2* | 12/2009 | Yamamoto | F16D 65/18 188/72.8 |
| 7,721,853 B2* | 5/2010 | Chittka | F16D 65/18 188/162 |

(Continued)

*Primary Examiner* — Thomas W Irvin
(74) *Attorney, Agent, or Firm* — Ladas & Parry, LLP

(57) ABSTRACT

A disk brake piston having a spindle nut, and a load bearing column within a piston body. The load bearing column includes a footing configured to push against a brake pad and a core extending from the metal footing and slidably located within the piston body, wherein the spindle nut is configured to contact and push the metal core which pushes the metal footing which pushes on the brake pad.

18 Claims, 12 Drawing Sheets

(56) References Cited

U.S. PATENT DOCUMENTS

| | | | | |
|---|---|---|---|---|
| 7,942,247 B2* | 5/2011 | Adachi | ................ | B60T 13/741 188/156 |
| 8,056,684 B2 | 11/2011 | Smith et al. | | |
| 8,061,491 B2* | 11/2011 | Tristano | ................ | B60T 13/745 188/162 |
| 8,069,961 B2* | 12/2011 | Watada | ................... | F16D 65/18 188/71.9 |
| 8,322,495 B2* | 12/2012 | Leiter | ..................... | B60T 7/107 188/72.6 |
| 8,561,762 B2 | 10/2013 | Schupska et al. | | |
| 8,622,179 B2* | 1/2014 | Watanabe | ............... | B60T 7/042 188/1.11 E |
| 8,668,057 B2* | 3/2014 | Kim | ....................... | F16D 65/18 188/72.9 |
| 8,733,512 B2* | 5/2014 | Kim | ....................... | F16D 65/00 188/106 F |
| 8,869,677 B2 | 10/2014 | Koch et al. | | |
| 8,881,874 B2* | 11/2014 | Kong | ..................... | F16D 65/18 188/71.8 |
| 8,996,270 B2* | 3/2015 | Bieltz | ................... | B60T 13/746 188/156 |
| 9,068,613 B2* | 6/2015 | Baehrle-Miller | ....... | F16D 65/18 |
| 9,340,190 B2* | 5/2016 | Qian | .................... | F16D 55/226 |
| 9,469,288 B2* | 10/2016 | Sussek | ................. | B60T 17/221 |
| 9,593,728 B2* | 3/2017 | DeMorais | ............. | B60T 13/741 |
| 9,771,993 B2* | 9/2017 | Ambs | ..................... | F16D 65/18 |
| 2005/0077782 A1* | 4/2005 | Horiuchi | ............... | B60T 13/741 303/20 |
| 2006/0289251 A1 | 12/2006 | DeMorais et al. | | |
| 2006/0289253 A1 | 12/2006 | DeMorais et al. | | |
| 2008/0087507 A1 | 4/2008 | DeMorais et al. | | |
| 2017/0097060 A1* | 4/2017 | Baehrle-Miller | ..... | B60T 13/741 |
| 2017/0159733 A1* | 6/2017 | Chelaidite | .............. | F16D 65/18 |

* cited by examiner

DISK BRAKE PISTON

TECHNICAL FIELD

This disclosure relates to pistons for disk brake systems.

BACKGROUND

The present disclosure relates to disk brake pistons and piston systems, such as are used for various vehicles including automobiles, trucks, aircraft, trains and the like. Embodiments of the disclosure include pistons having provision for a screw actuated braking capability including those having a treaded actuator system for a parking brake and a pressure actuated capability for additional braking capability such as braking capability actuated by a pneumatic or hydraulic pressure source. In various embodiments, the screw actuated braking capability can be actuated by a lever or a motor such as an electric motor or any other suitable type of motor. In some embodiments, a device, such as a lever or other device such as is used for setting and releasing a parking brake can be used to rotate the spindle 3.

Disk brake pistons, such as disclosed herein, can be of any suitable construction, and can be of any suitable material or combination of materials to provide the desired strength, durability and responsiveness. Features such as low weight and low internal volume can be desirable.

As shown in FIGS. 1 and 2, an embodiment of a forged steel piston 1 can have an internal cavity 2 with a threaded spindle 3 engaging an internally threaded nut 4 and a nut contact surface 9 having a conical shape which interfaces with a piston contact surface 10 of the nut 4. Upon relative rotation between the spindle 3 and the nut 4 the nut moves linearly toward or away from the brake pad end of the piston 5. Upon relative rotation in a first direction, the nut 4 moves toward the brake pad end of the piston 5 and then engages and pushes against the brake pad end of the piston, with the brake pad end of the piston 5 engaging the brake pad 6 directly or indirectly and causing a braking action between the brake pads 6, 7 and the rotor. In some embodiments, the movement of the nut 4 toward the brake pad end of the piston 5 can be done in conjunction with a pressure force being applied to the piston, and the force applied by the nut 4 to the brake pad end of the piston 5 can supplement the pressure force or can serve to partially or fully maintain the force applied to the piston by the pressure system when the pressure is reduced or eliminated. In some embodiments, the spindle 3 and nut 4 can be part of a parking brake, such as an electromechanically actuated parking brake actuated by a motor 8.

Upon relative rotation in a second direction, the nut 4 moves away from the brake pad end of the piston 5 and reduces and/or removes the force of the nut 4 acting upon the brake pad end of the piston 5.

However, while pistons made from forged steel with machined surfaces can be strong and have precise dimensions, they can be heavy and expensive to make. Difficulties in manufacturing can be particularly evident in some aspects of the machining necessary for the internal structure of the piston.

FIG. 3 shows a brake system 210 having a piston partially constructed of phenolic material. Here, the brake system 210 may also include a first brake member 222 that is used in engaging a first side 224 of the wheel brake rotor 220 and that is attached to the first portion 214 of the brake caliper housing 212. Similarly, the brake system 210 may include a second brake member 226 that is used in engaging a second side 228 of the wheel brake rotor 220 and that is attached to the second portion 216 of the brake caliper housing 212. Each brake member 222, 226 includes a brake pad 230 having a brake shoe 232 attached thereon.

With reference to FIG. 3, the brake piston 270 may include a core 274 having an axial height H1 and an outer layer 276 having an axial height H2. As shown, H2 is at least 0.5H1. The opening 272 may be formed in the core 274, as shown. The core 274 may be formed substantially of a metal and the outer layer 276 may be formed substantially of phenolic material. In one embodiment, the core 274 is formed substantially of steel and the phenolic outer layer 276 is attached to the core 274 in a process known as overmolding. In one embodiment, at least one surface variation 277 is formed on an outer surface of the core 274 to improve retention of the outer layer 276 to the core 274 during the overmolding process. By surface variation it is meant a change on the surface that is either concave or convex with respect to the surrounding surface.

A caliper piston seal 280 may be positioned between the brake caliper housing surface defining the bore 234 and the outer layer 276 to maintain proper closure around the piston 270. With reference now to FIG. 3, the brake piston 270 may have a first end 282 with a brake member contact or mating surface 284 that contacts the second brake member 226 to cause it to engage or contact the second side 228 of the wheel brake rotor 220. In one embodiment, the brake member contact surface 284 is located on an outer surface of the metal core 274 that has no outer layer 276. Thus, the brake member contact surface 284 in this embodiment has no phenolic material improving the mating engagement of the brake piston 270 to the brake member 226. The opening 272 in the core 274 may be defined by a surface that includes a first spindle nut contact surface 286 that is contacted by a first outer surface 251 of the spindle nut 252 to prevent rotation of the spindle nut 252 with respect to the brake piston 270. The opening 272 in the core 274 may also be defined by a second spindle nut contact surface 288 that is contacted by a second outer surface 253 of the spindle nut 252 to force the brake piston 270 to slide within the bore 234. In one embodiment, the second spindle nut contact surface 288 is angled, as shown, to provide a better surface for the spindle nut 252 to act upon. In one embodiment, neither the first nor the second spindle nut contact surfaces 286, 288 has a phenolic material thereon improving the mating engagement of the spindle nut 252 to the brake piston 270.

Other configurations can be used such as that shown in FIG. 4 which shows a disc brake caliper assembly 310 having a rod 340 positioned within the piston 324. In some situations, severe operating conditions may force piston 324 into bore 322 to a knock-back position, K, resulting in an undesirable clearance, C. On the next brake application, the operator will have to depress the brake pedal much farther than desired to fill chamber 326 with sufficient fluid to apply the brakes. To prevent piston 324 from being forced from the normal retracted position, R, to the knock back position, K, the present invention incorporates a linkage 336. Linkage 336, preferably a shaft with a threaded end 338, is arranged adjacent to piston 324 and movable between first, F, and second, S, positions. Specifically, a rod 340 is integrally formed with piston 324 and extends therefrom toward end 338. A support 342 is secured to housing 318 within bore 322 for supporting linkage 336. Support 342 has a hole 344 for at least partially receiving rod 340 and a threaded portion 346 for threadingly receiving end 338 of linkage 336.

As brake pads 312 wear, a clearance will result between rod 340 and linkage 336 that corresponds to the clearance, C, between the normal retracted position, R, and the knock-back position, K. The clearance between rod 340 and linkage 336 defines first position, F, of linkage 336. While linkage 336 is in the first position, F, piston 324 is able to move to the knock-back position, K, in the same undesirable manner as the prior art.

An actuator 350 is used to rotatingly drive linkage 336 to eliminate the clearance between rod 340 and linkage 336 by moving linkage 336 from the first position, F, to the second position, S. In the second position, linkage 336 abuts rod 340. Since linkage 336 is supported by support 342, which is secured to housing 318, rod 340 is prevented from moving inwardly relative to housing 318. In this manner, actuator 350 eliminates the clearance to prevent piston 324 from moving within bore 322 away from rotor 314 from the normal retracted position, R, to the knock-back position, K, in response to severe operating conditions.

Further, while the use of plastic material, such as those made from phenolic resin, for production of pistons can result in a lighter and less expensive piston, a plastic piston is generally not as strong as steel and can be prone to catastrophic failure such as cracking.

Accordingly, it is desirable to make a piston which is lighter weight and yet sufficiently strong and tough to survive the forces associated with braking a vehicle to slow, stop or maintain the position of the vehicle.

In addition, the construction of a disk brake piston, a disk brake piston assembly and the features internal thereto are desirably designed so as to facilitate assembly and service operations, including but not limited to filling the brakes with an appropriate fluid and purging undesirable fluids from the interior of the piston, such as by bleeding a hydraulic brake system.

SUMMARY

In a first embodiment disclosed herein is a disk brake piston comprising: a spindle nut; and a load bearing column within a piston body, the load bearing column comprising: a footing configured to push against a brake pad; and a core extending from the metal footing and slidably located within the piston body; wherein the spindle nut is configured to contact and push the metal core which pushes the metal footing which pushes on the brake pad.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
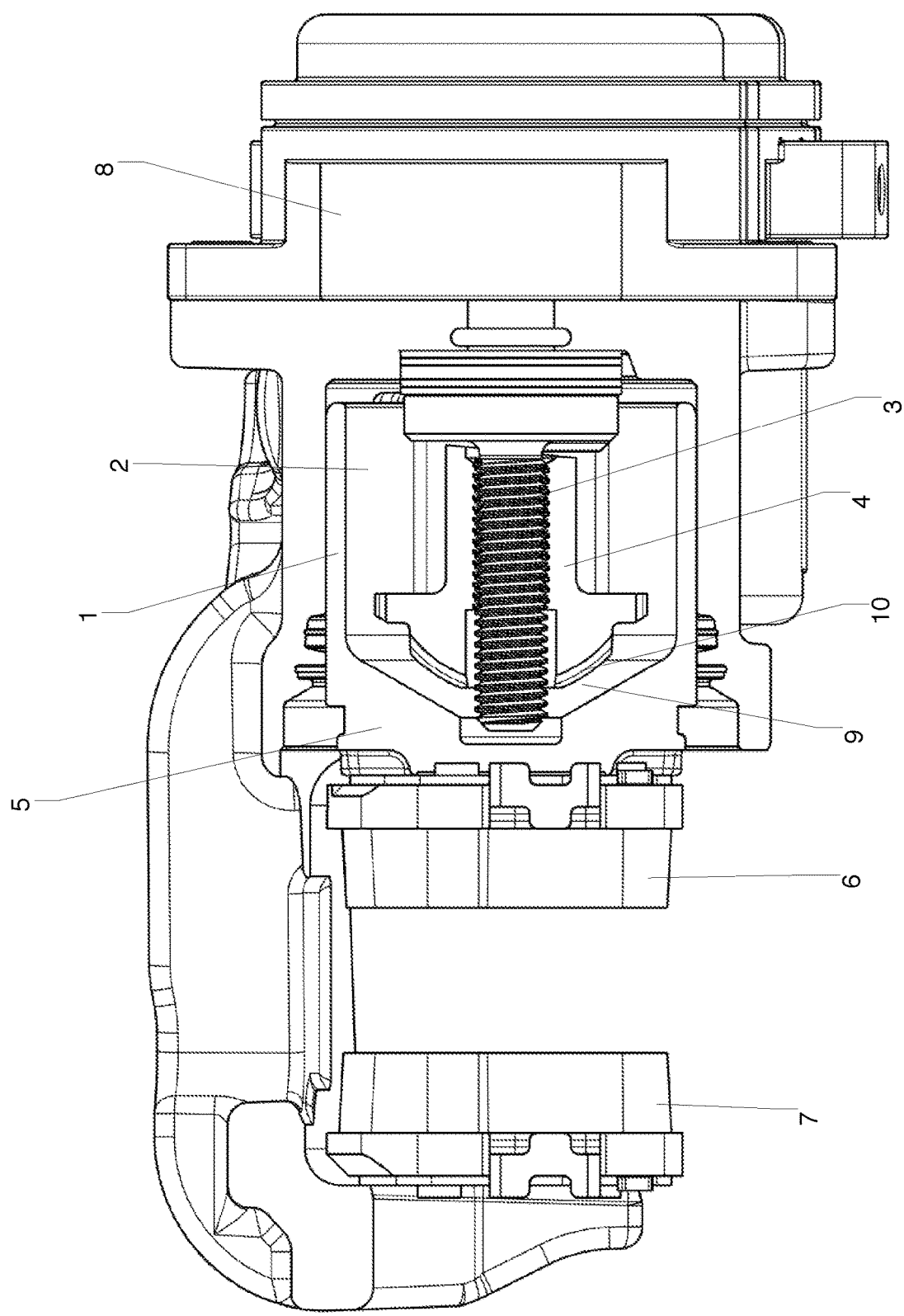
FIG. 1 shows a diagram of an embodiment of a brake system utilizing a forged piston.
Figure 2:
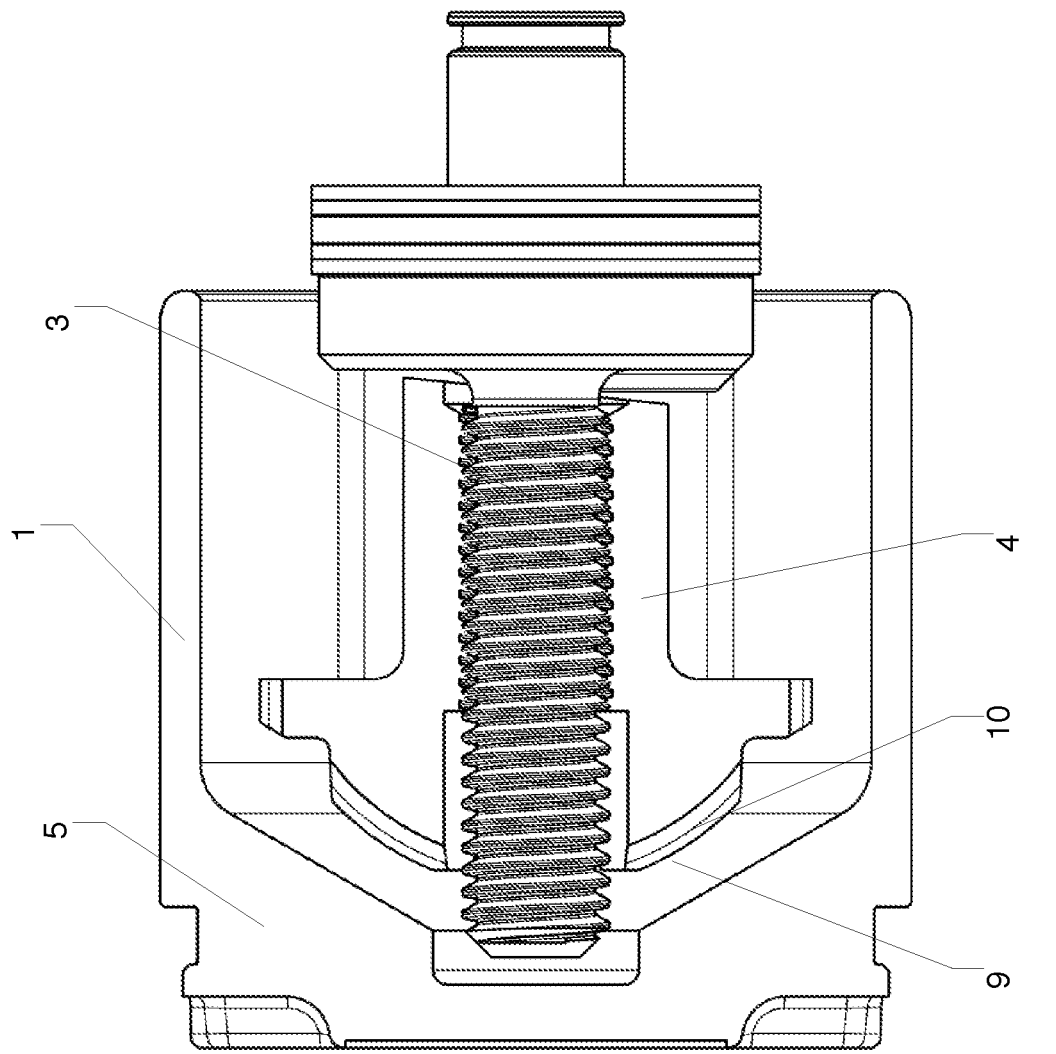
FIG. 2 shows a diagram of an embodiment of a forged piston.
Figure 3:
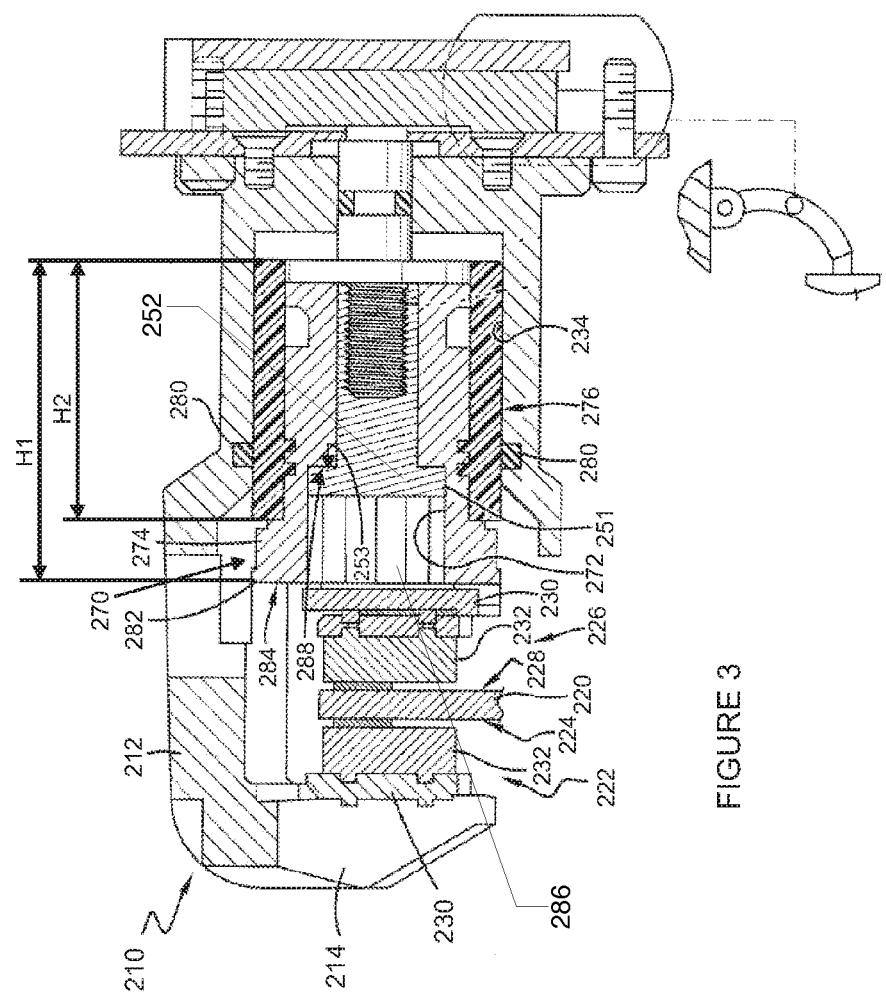
FIG. 3 shows another embodiment of a brake system.
Figure 4:
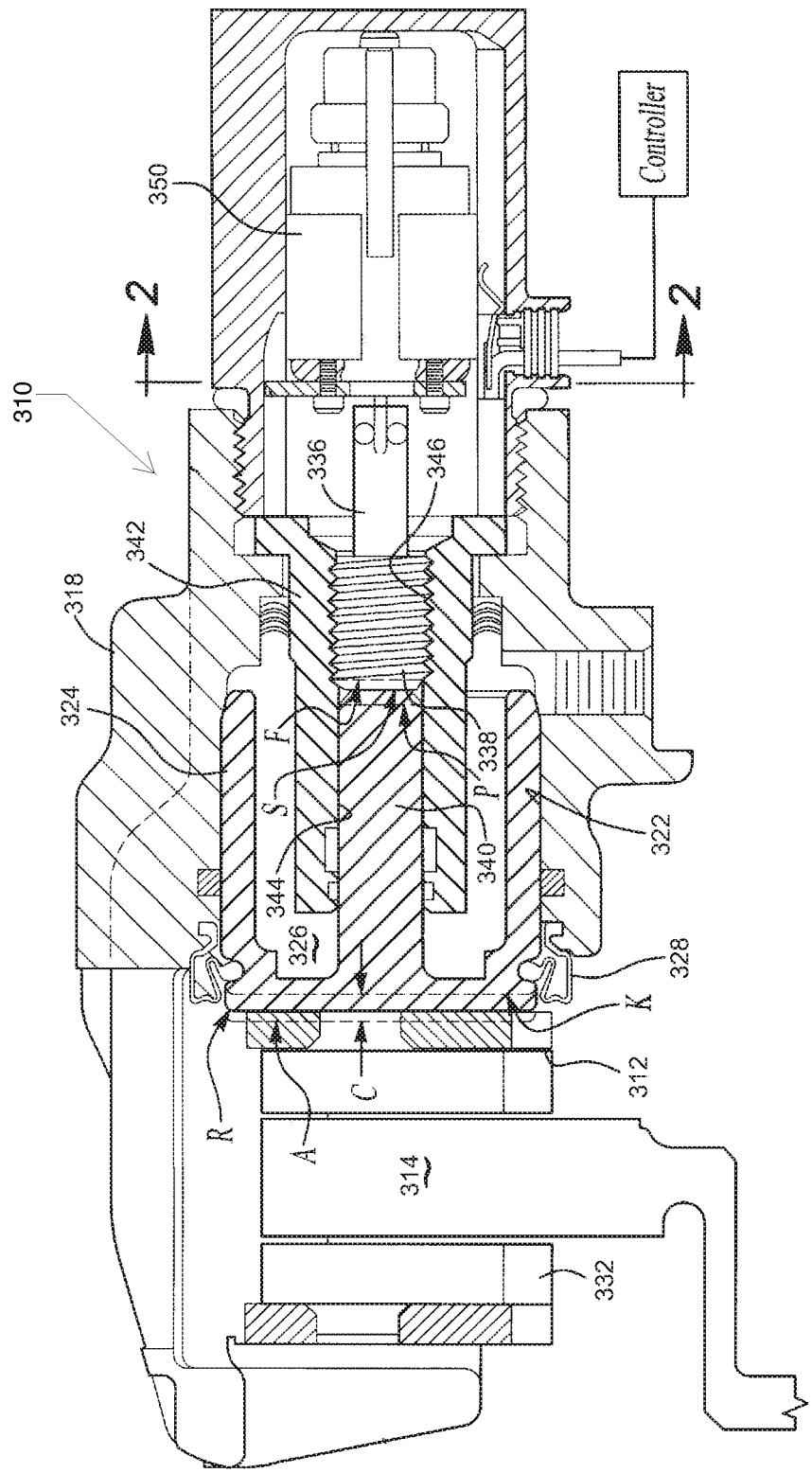
FIG. 4 shows another embodiment of a disc brake caliper assembly.
Figure 5:
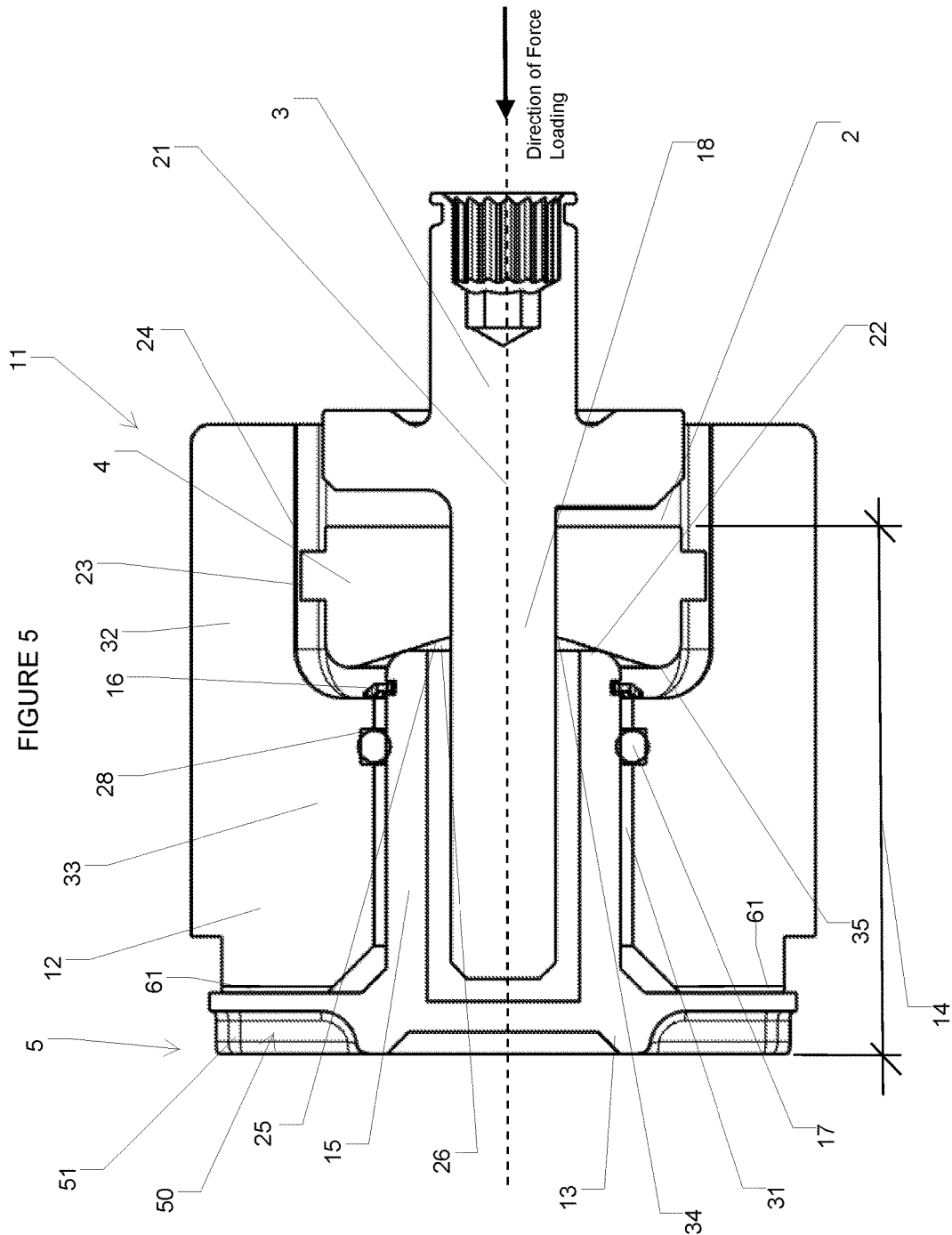
FIG. 5 shows a diagram of an embodiment of a piston having a load bearing column construction.
Figure 7:
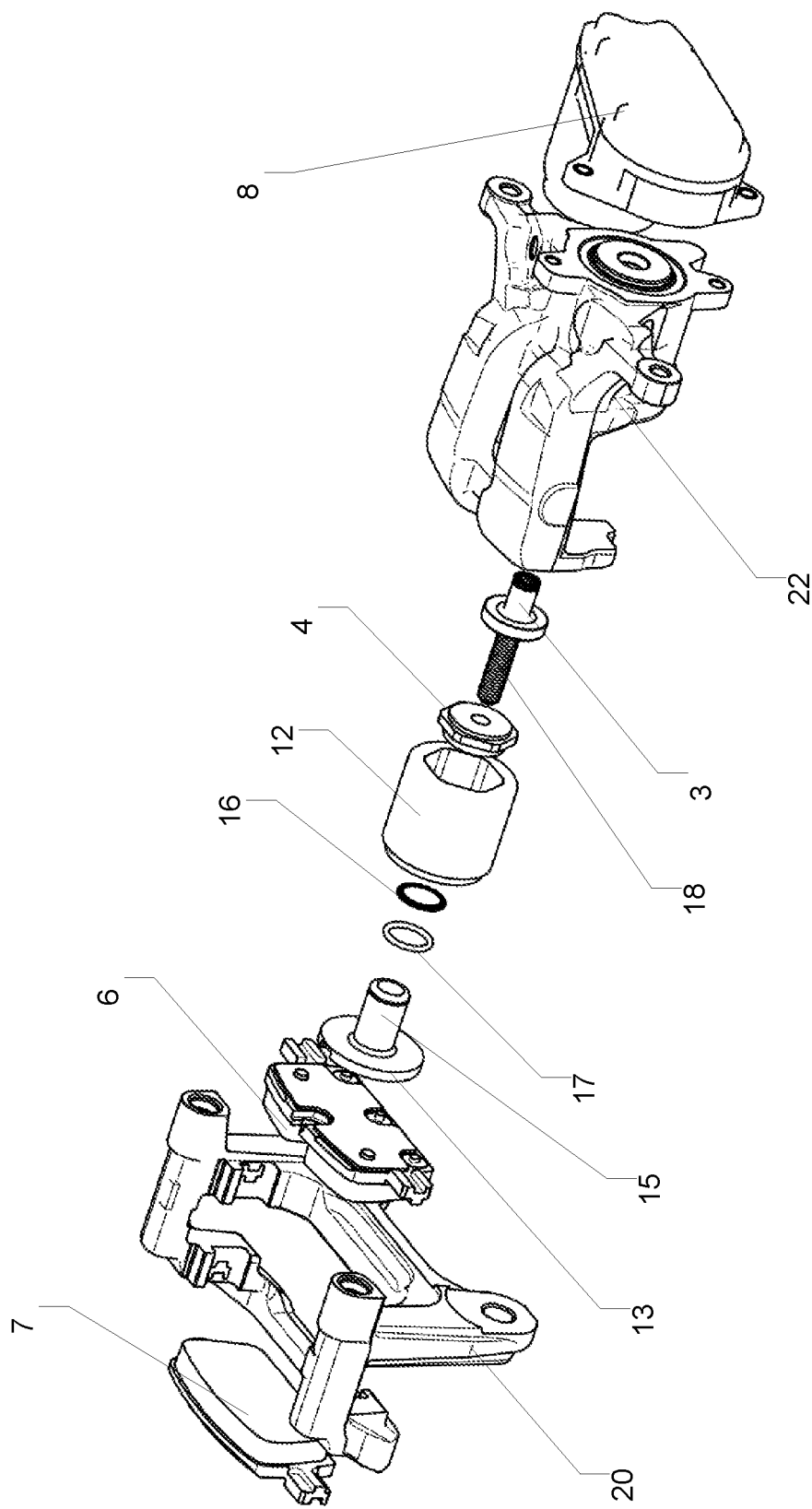
FIG. 7 shows an exploded view of an embodiment of a piston with a load bearing column construction in a disk brake caliper.

FIG. 5 shows an embodiment of a disk brake piston 11 having a load bearing column construction. Here a load bearing column 14 comprising a footing 13, core 15 and spindle nut 4 is assembled with a piston body 12 and spindle 3. Here, the footing 13 covers at least a portion of the brake end of the piston 5 with the core 15 extending from the footing 13 and into a central bore 31 of the piston body 12 in a first zone 33 of the piston body 12. The end of the core 22 distal the footing 13 can contact spindle nut 4 present in an internal cavity 2 of the second zone 32 of the piston body 12. The first and second zones 33, 32 of the piston body have inner diameters where the inner diameter of the first zone is smaller than the inner diameter of the second zone. The spindle nut 4 interfaces with a spindle 3. In some embodiments, the spindle 3 can have an elongate portion 18 with threads which engage corresponding threads inside of spindle nut 4. The spindle nut 4 can have an outer surface 23 which interfaces with an inner surface 24 of the piston body 12 in internal cavity 2. The inner surface 24 and outer surface 23 can be configured with surface shapes which restrict or prevent relative rotation of the spindle nut 4 in relation to the piston body 12. In some embodiments, a boot, such as a rubber boot can be positioned to close, seal or provide a dust barrier between the piston body 12 and the footing 13. Upon rotation of spindle 3 in a first direction, the spindle nut 4 will travel laterally toward the brake pad end of piston 5 and the footing 15. As the spindle 3 turns, the spindle nut 4 will contact the core 15 and push against core 15. Core 15 will then in turn push against the footing 13 which will in turn push against a brake pad 6, as shown in FIG. 7, either directly or indirectly such as through one or more intervening materials including, but not limited to, a brake pad backing, a shim or other parts associated with a brake pad 6.

In some embodiments, a piston can have improved NVH (noise, vibration, harshness) characteristics. In some embodiments, one or more vibration dampeners 61, such as a pad, washer, and/or insert or a set of pads, washers and/or inserts can be located between the footing 13 and the piston body 12. Such vibration dampeners can be any material and any design that will reduce or attenuate vibration and/or noise moving through the brake parts. In some embodiments, the brake piston can have inherent noise/vibration dampening or noise/vibration reducing properties due to the use of noise and/or vibration dampening material in the piston body 12, the core 15, the footing 13 and/or the spindle nut 4. In some embodiments, the piston can have improved NVH characteristics by interrupting a metallic noise/vibration transmission route by providing a gap between metallic parts such as a metallic core 15 and the spindle nut 4 during normal (i.e. hydraulic and/or pneumatic actuated) braking while still providing a metallic force transmission path during use of the parking brake. In some embodiments, a non-metallic or plastic piston body can be actuated pneumatically or hydraulically push on a parking brake part, such as the footing 13, to actuate the brakes.

Upon rotation of spindle 3 in a second direction, spindle nut 4 can decrease the force being applied to the core 15 and in some embodiments spindle nut 4 can move away from the core if continued turning of spindle 3 occurs.

In various embodiments of the load bearing column design (or "force column") design, the force to be applied to the brake pad 6 can be transferred along the direction of force loading from the spindle 3 to the spindle nut 4 to the footing to the brake pad 6 without substantial force in the direction of force loading being applied to the piston body 12. Accordingly, in some embodiments, the weaker materials or more brittle materials or thinner materials can be used for the piston body if desired. (Although, in some embodiments, stronger materials such as steels, including forged steels, and other metals can be used for the piston body 12 and utilize a thin wall for a conventional wall thickness construction.

Figure 6:
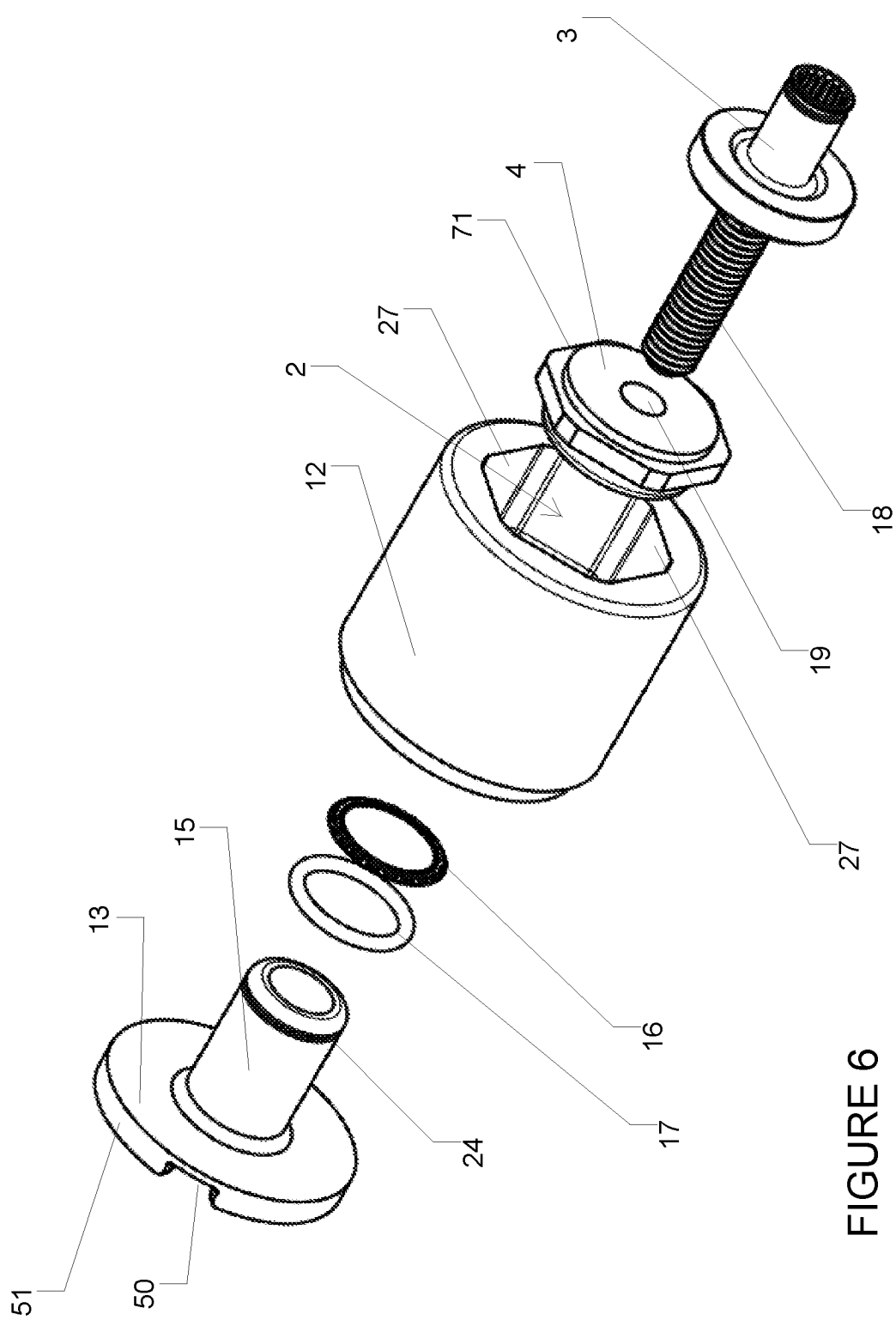
FIG. 6 shows an exploded perspective view of an embodiment of a piston with a load bearing column construction.

FIG. 6 shows an exploded view of a piston having force column construction. Here, footing 13 with core 15 extending from a central portion thereof is shown with O-ring 17 for sealing between the core and the piston body 12 to prevent leakage of a brake actuating fluid, such as compressed air or hydraulic fluid or brake fluid. In various embodiments, an O-ring groove can be provided in the piston body 12 or in the core 15. A retaining clip 16 can be used to prevent the footing 13 and core 15 from accidentally being removed from the piston body 12. In one embodiment, core 15 includes a groove 24 which upon assembly into piston body 12 is present in internal cavity 2. Retaining clip 16 can be engaged into the groove 24 and extend outward to present a larger diameter than the internal diameter of the portion of body 12 which core 15 passed through. FIG. 6 also shows spindle 3 and spindle nut 4 with opening 19 through which elongate portion 18 of spindle 3 passes. The piston body 12 has flat surfaces 27 on an inner surface of the piston body 12.

FIG. 7 shows a piston having force column construction being assembled into a brake caliper. Here, inner and outer pads 6 and 7 are assembled into a carrier 20. Also present on the pads are backing plates and shims. The footing 13 with core 15 are assembled into a piston body 12 with spindle nut 4 and spindle 3 to form a piston. The piston is assembled into caliper housing 22 which is assembled with the carrier 20 including inner and outer pads 6 and 7. Motor 8 engages spindle 3.

Materials of Construction

Various materials construction can be used for the piston body 12, the footing 13, the core 15, the spindle nut 4 and spindle 3. In one embodiment, the footing 13, core 15, spindle nut 4, spindle 3 and piston body 12 can each be selected independently from metals, ceramics, polymers, composites and layered ceramics. Suitable metals can include, but are not limited to, steel, iron, titanium, copper, brass, bronze, aluminum, nickel, and the like or alloys of iron, titanium, copper, aluminum or nickel and the like. Suitable ceramics include, but are not limited to, alumina, titania, silicon, silicon carbide, silicon nitride, zirconia or some other suitable ceramic. Polymeric materials include thermoplastic and thermosetting plastics including, but not limited to phenolics, epoxies, polyimides, polyphenylsulfides, fluoric polymers, polyaryletherketones, polyarylsulfones, and other polymers as would have suitable properties for the temperature, the chemical environment (e.g. hydraulic fluid, brake fluid, air, steam, etc.) strength (e.g. modulus of elasticity, ultimate tensile strength, 2% offset strength, resistance to denting or piercing, resistance to flow such as plastic deformation and cold flow) and toughness (e.g. as measured by impact tests and other means of determining energy absorbed prior to fracture.) Suitable composites include filled polymers, such as polymers having fibers or fabrics imbedded therein. Composites can include materials such as fiberglass and carbon fiber materials and similar types of materials. Layered ceramics can include ceramics layered with another material, such as polymers and/or metals.

Preferred polymeric material can include polymeric material made from a phenolic resin, or other appropriate polymeric material having suitable strength, rigidity, chemical resistance, low compressibility, and temperature capabilities for use in the environment of a disk brake piston. For example, a polymeric materials having a temperature stability up to approximately 150° C., 200° C., 250° C. 300° C., 350° C. or higher can be favorably incorporated into the design. Suitable polymeric materials can be filled, such as glass fiber-filled, mineral-filled, metal-filled, and/or filled with other material appropriate for the strength temperature and durability requirements, or unfilled. Polymeric materials may be laminated and/or reinforced as desired. Suitable polymeric materials can include, but are not limited to, those made from phenolic resins such as novolacs and resols and include cross-linked forms of phenolic resins.

In some embodiments, polymeric material having chemical resistance toward one or more brake fluids such as brake fluids utilizing a glycol-ether base, polyethylene glycol base, mineral oil base, castor oil base, alcohol base borate ester base or silicone base, or brake fluids based upon some other material as well as combinations of these materials can be favorably used when properly matched to the brake fluid to be used. In some embodiments, polymeric material having chemical resistance toward hydraulic fluid or a gas, such as steam or air, can be favorably used when matched to the fluid being used for brake actuation.

In some preferred embodiments, a phenolic piston body 12 can be combined with a metal footing 13, a metal core 15 and a metal spindle nut 4. Some preferred embodiments can also utilize a phenolic piston body 12 with a steel footing 13, a steel core 15 and a steel spindle nut 4.

Piston Body and Spindle Nut

The piston body 12 can have one or more internal surfaces for interfacing with a spindle nut 4, as shown in FIG. 5, which can be positioned within the piston body 12, and the internal surface(s) serve to limit and/or prevent relative rotation between the spindle nut 4 and the piston body 12. The internal surfaces of the piston body 12 can also be configured to allow the nut to move axially in a direction substantially parallel to a central axis 21 of the piston 11.

The central axis 21 and the brake pad end of the piston 5 can be configured such that the central axis 21 is perpendicular or substantially perpendicular to the footing 13.

The internal surface of the piston body 12 can be configured to comprise 3 flat surfaces 27 on the inside of the piston body 12, or six flat surfaces 27 arranged so as to interface with a spindle nut 4 such as a hexagonal shaped spindle nut 4, or only 1 or only 2 flat surfaces 27. However, in various embodiments, the internal surface of the piston body 12 can be configured to comprise various numbers of flat surfaces 27, such as 1, 2, 3, 4, 5, 6, 7, 8 or more and the flat surfaces 27 can be configured to interface with a nut having a suitable number of flat surfaces 71, such as the same number of flat surfaces, or greater than or fewer than the number of flat surfaces 27 on the piston body 12 and the number of flat surfaces 71 can be 1, 2, 3, 4, 5, 6, 7, 8 or more. In addition, one or more or all of the flat surfaces 27 and/or flat surfaces 71 can be replaced with curved surfaces, such as curved surfaces having a higher or lower radius of curvature than a radius of curvature of the interior or exterior of the piston body 12 or spindle nut 4, and the curved surfaces of the inside of the piston body can be curved outward (having a center of curvature toward or beyond the central axis 21) or inward (having a center of curvature away from the central axis 21). In some embodiments, the flat 27 or curved surfaces of the internal surface of the piston body 2 which interface with the spindle nut 4 can be linked by sharp corners, or by radiused corners, or by circular cut-out corners or by additional flat surfaces.

In some embodiments, the surfaces 71 of the spindle nut 4 corresponding to the flat or curved ends of the piston body 12 can be flat or curved or some combination thereof and configured to interface with the flat or curved ends of the piston body 12 to limit, restrict or prevent relative rotation between the piston body 12 and the spindle nut 4.

The spindle nut 4 can also include a threaded interior surface which operationally engages the threaded elongate portion 18 of the spindle 3. The spindle nut 4 can be internally treaded for only a portion of its length, as shown in FIG. 7, or for its entire length. The nut can include a flanged section (not shown) or outer surface 23, which can include one or more surfaces which engage the piston body 12 in the internal cavity 2 to limit, restrain, impair or prevent relative rotation of the piston body 12 and the spindle nut 4.

The spindle nut 4 can also include a hollow 24 on the surface facing the core 15. Such a hollow 26 can be sized to receive an end of the core 15, and in some embodiments provide stability to the core 15 and/or the footing 13 or to aid in aligning the core 15 with the spindle nut 4. In some embodiments, the hollow can have a conical shaped surface 25 as shown in FIG. 5. In some embodiments, the end of the core 15 can contact the conical shaped surface 25 at a location between the peak 34 and the base 35 of the conical shape, such as midway along the surface, or at a location closer to the peak or closer to the base.

In some embodiments, the core 15 can have an end which contacts the spindle nut 4 which is beveled or rounded. In some embodiments, the end of the core 15 which contacts the spindle nut 4 can have a shape which is complementary to the shape of the hollow 26 of the spindle nut 4. For example, the complementary shapes can include a cylindrical end to the core for a cylindrical hollow 26, or a conical end to the core for a conical shaped hollow 26. In some embodiments, the core end 22 can be cylindrical or cylindrical with a rounded end and the hollow 26 can be conical. In some embodiments, the core end 22 can include a hollow to receive a portion of the spindle nut 4 and at least one of the core end 22 and the portion of the spindle nut 4 received in the core end 22 hollow can have a conically shaped surface.

In the various embodiments, features described in the alternative, for example curved ends and flat surfaces for the interior surface of the piston body and the exterior surface of the nut can be interchanged within the disclosure where only one of the alternatives is described, except where the context indicates otherwise.

In some embodiments, the piston body 12 and/or the spindle nut 4 and/or core 15 and/or spindle 3 can be sized and dimensioned to reduce the open volume in the piston that would be filled with fluid during operation. In some embodiments, a wall thickness of the piston body 12 can be increased. In some embodiments, the piston body 12 can be configured with a first zone 33 having a different wall thickness than a second zone 32. Such a configuration where the first zone 33 has a thicker wall than the second zone 32, such as that shown in FIG. 5, is able to reduce the fluid volume while also achieving or maintaining a large hydraulic area for hydraulic operation of the brake (or pneumatic area for pneumatic operation of the brake.) In some embodiments, the wall thickness can be varied by changing the diameter of the central bore 31 and/or the internal cavity 2.

In some embodiments, it can desirable to configure the piston to utilize a lighter material, such as a phenolic to reduce the fluid volume of the piston by utilizing thicker walls for the piston body. Such a configuration can reduce the fluid volume and reduce the weight of the piston.

In some embodiments, other parts of the brake piston can be increased in size to reduce the fluid volume such as the diameter of the elongate portion 18 of the spindle, a length and/or diameter of the spindle nut 4 and/or the spindle 3. In some embodiments, one or more dimensions of the core 15 can be varied to reduce the fluid volume, such as the diameter, wall thickness and length.

Footing

The footing 13 generally can have a first face proximate a disc brake pad and a second face proximate an end of the piston body 12. In some embodiments, the footing 13 can cover the entirety of the end of the piston body 12, extend past the end of the piston body 12, or cover less than the entirety of the end of the piston body 12. In some embodiments, footing 13 when assembled with piston body 12 can be embedded or partially embedded in the end of piston body 12 or can extend from the end of piston body 12. In some embodiments, footing 13 can contact the end of piston body 12 and in some embodiments there can be an intervening structure, such as a washer or series of washers which can in some embodiments serve to modify the ability of footing 13 to rotate in relation to piston body 12. Such rotation modification can take the form of friction increasing or friction reducing surfaces or can provide interlocking or inter-meshing lugs or protrusions and corresponding recesses. In some embodiments, the second face of the piston body can include rotation modification structures such as lugs or protrusions and corresponding recesses between the second face of footing 13 and the end of piston body 12. In some embodiments, footing 13 can be embedded in the end of piston body 12 and have an outer diameter defining a shape corresponding to the inner diameter of the end of piston body 12 wherein the interaction between the corresponding outer diameter and inner diameter limits or eliminates relative rotation between footing 13 and piston body 12. In some embodiments, a combination of the corresponding inner and outer diameters and rotation modifying surfaces between the face of footing 13 and end of piston body 12 and/or intervening structures and/or intervening structures with rotation modifying surfaces can be used together.

In some embodiments, footing 13 can include anti-rotation lugs or recesses 50 on the first face of footing 13 which correspond to recesses or lugs 51 on inner brake pad 6 or which correspond to recesses or lugs 51 on a part functionally connected to the brake pad positioned between the footing 13 and inner brake pad 6. In use, the anti-rotation lugs or recesses 50 on footing 13 can interact with the corresponding recesses or lugs 51 to prevent rotation of footing 13 in relation to brake pad 6 and/or piston body 12.

In some embodiments, the inner brake pad 6 and/or a part functionally connected to the brake pad and positioned between the footing 13 and inner brake pad 6 can include a socket or recess or indentation to receive the first end of steel footing 13 and the shape of the outer diameter of steel footing 13 corresponds to the inner diameter of the socket/recess/indentation so as to prevent relative rotation between the two parts. In various embodiments, the corresponding shapes can include noncircular portions or can provide interfering features such as protrusions, such as splines, or ovalized shapes, shapes including flat surfaces, polygons, arcs with intervening flat surfaces or multifaceted shapes. (These combinations of shapes can also be used for providing non-rotation/limited rotation capability between the spindle nut 4 and the piston body 12.)

In some embodiments, footing 13 can include a cavity or recess in the first face. The cavity can be sized, positioned and shaped so as to provide a desired degree of resilience to the footing 13 when force is being applied to the footing by the core 15.

Spindle Nut and Core

Figure 8:
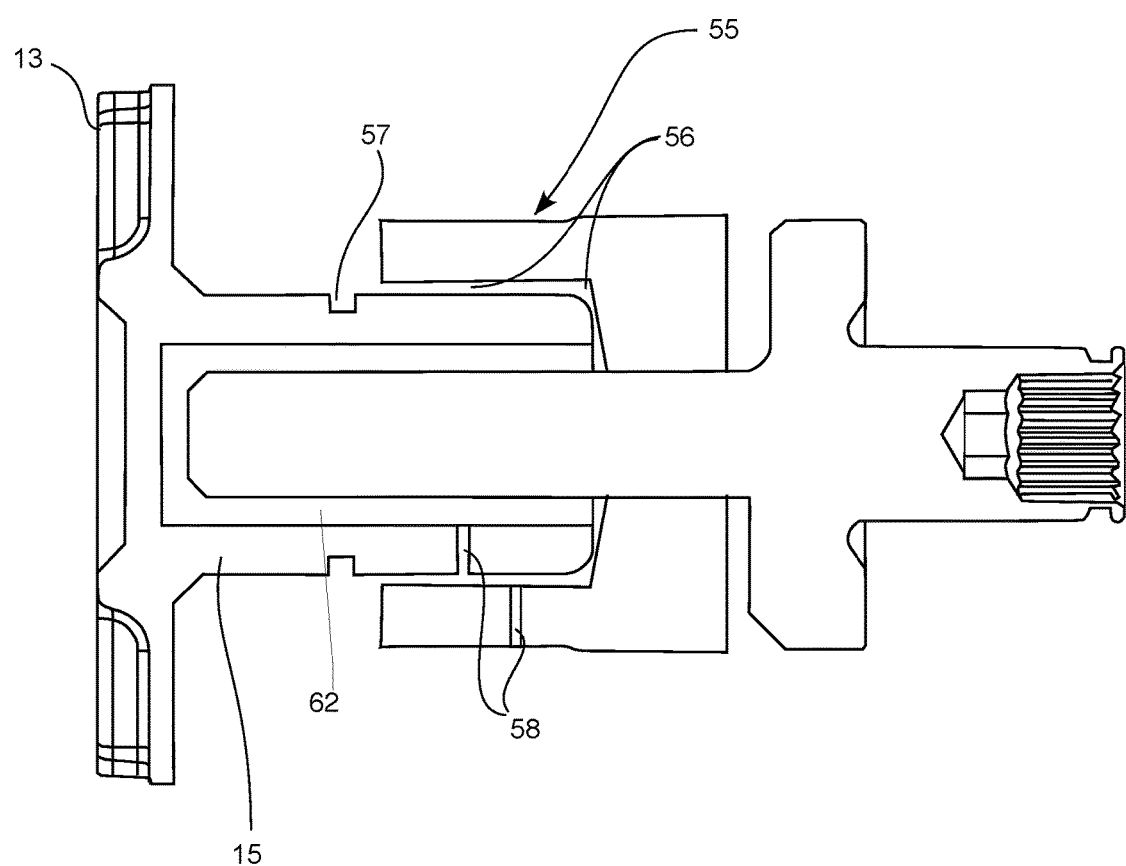
FIG. 8 shows an embodiment of a load bearing column and spindle nut with a sliding nonrotating joint.

The spindle nut 4 converts the rotary movement of spindle 3 into horizontal movement of the spindle nut 4 which pushes against the core 15 which in turn pushes against footing 13 which in turn pushes against inner brake pad 6. In some embodiments, spindle nut 4 can utilize a threaded connection between the spindle 3 and the spindle nut 4 together with a rotation limiting feature to convert the linear movement of spindle 3 to the linear or horizontal movement of spindle nut 4. In some embodiments, the rotation limiting feature can comprise the outer surface of the spindle nut 4 which contacts an inner surface of piston body 12 to limit or prevent rotation of the spindle nut 4. In some embodiments, a rotation limiting feature can include a nonrotating joint between the core 15 and the spindle nut 4, such as a sliding nonrotating joint comprising interacting surfaces of the outer diameter of spindle nut 4 and an inner surface of piston body 12. In some embodiments, a rotation limiting feature for spindle nut 4 can include interfering portions of spindle nut 4 and core 15. FIG. 8 shows an embodiment of a sliding nonrotating joint 55 between core 15 and spindle nut 4. Also shown in FIG. 8 are retainer groove 57, through hole 58 and channel 56. In some embodiments, channel 56 and through hole 58 can provide a flow path such as can be useful for filling, draining and/or bleeding the brake system with fluid and for allowing the flow of fluid as the brake parts move. In some embodiments, hydraulic fluid or pneumatic gas can provide brake actuating pressure to the opening 62 in a central part of core 15 to act on and push on footing 13 to provide braking force.

Figure 9:
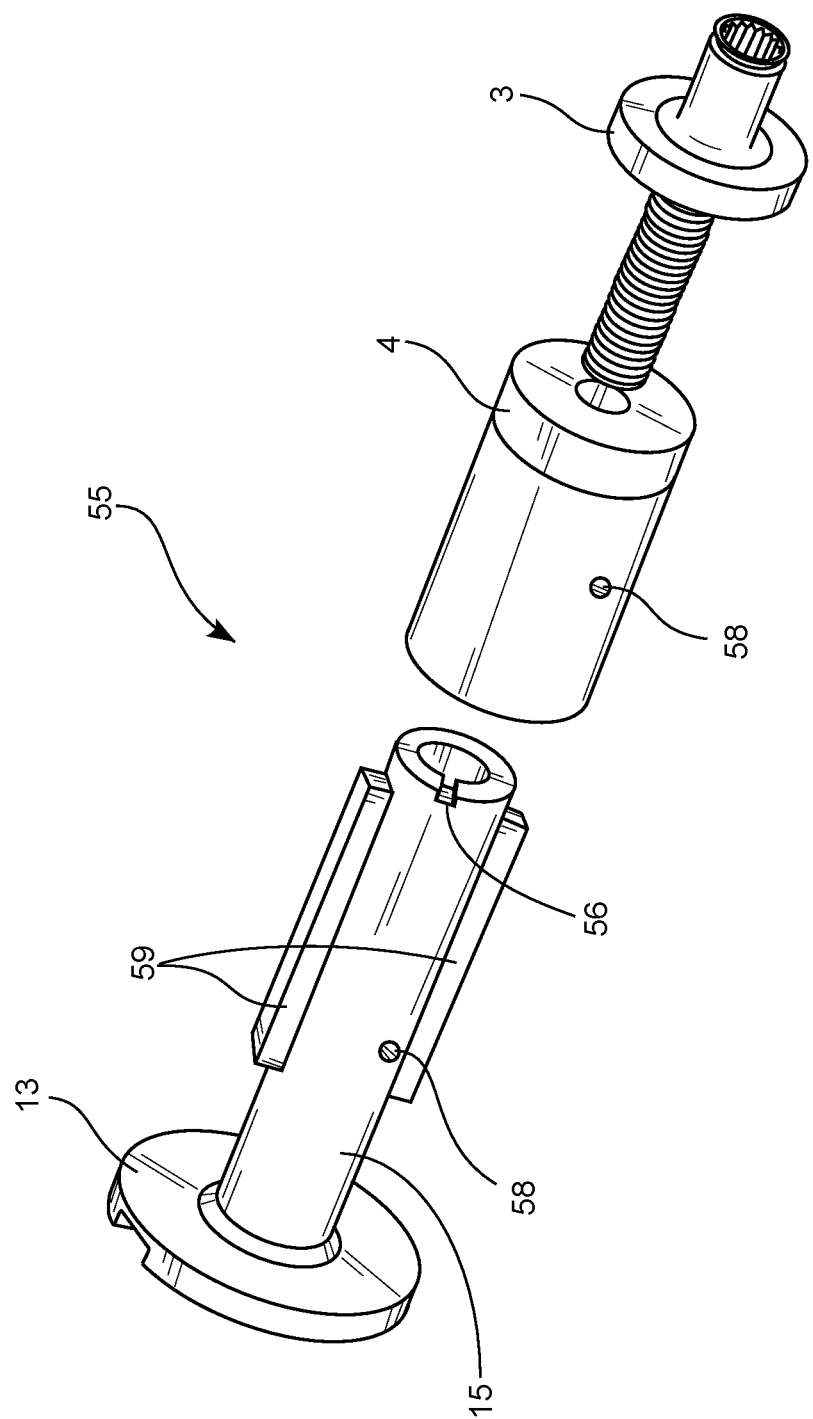
FIGS. 9 and 10 show exploded views of embodiments of a sliding nonrotating joint.
Figure 10:
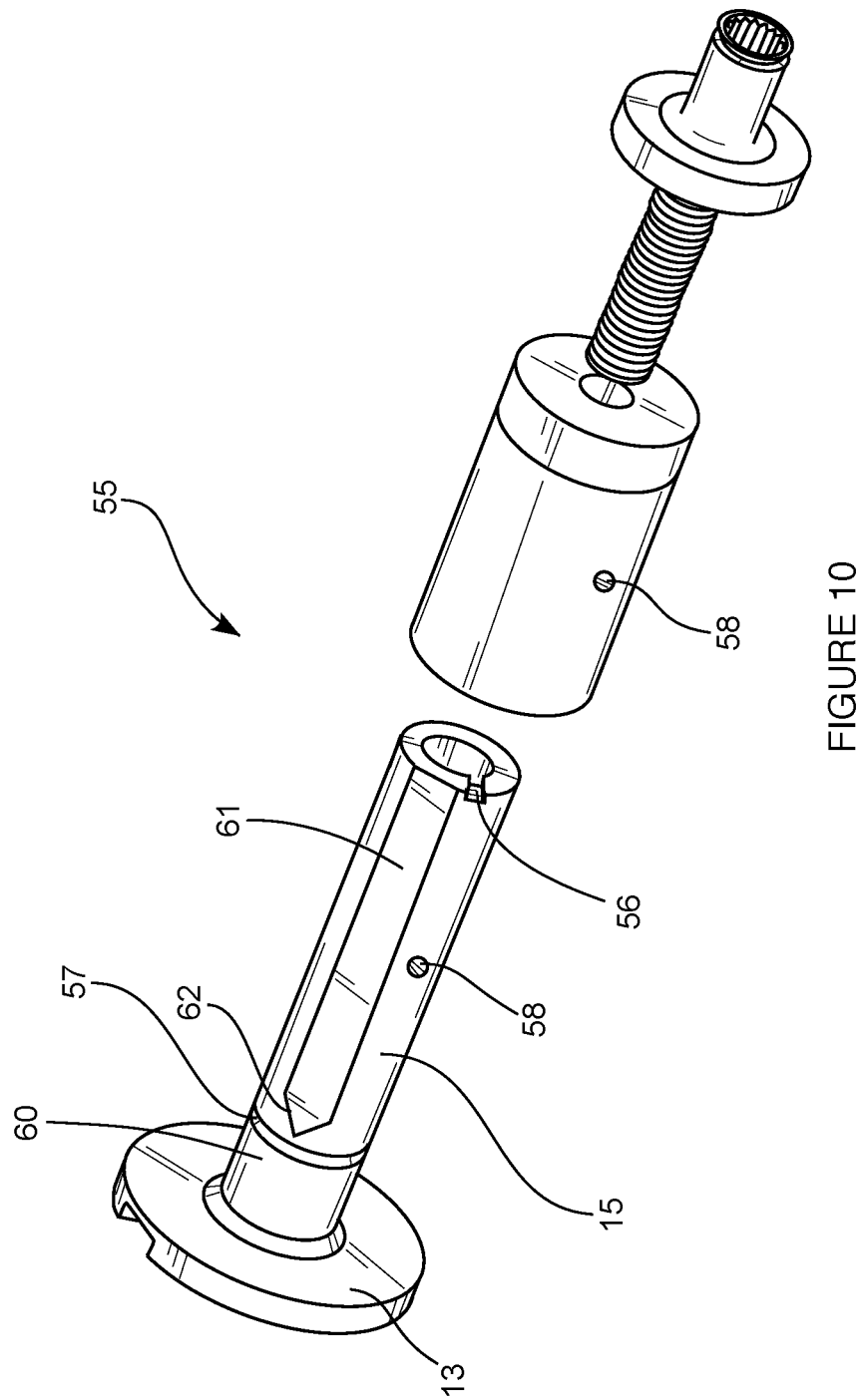
Figure 11:
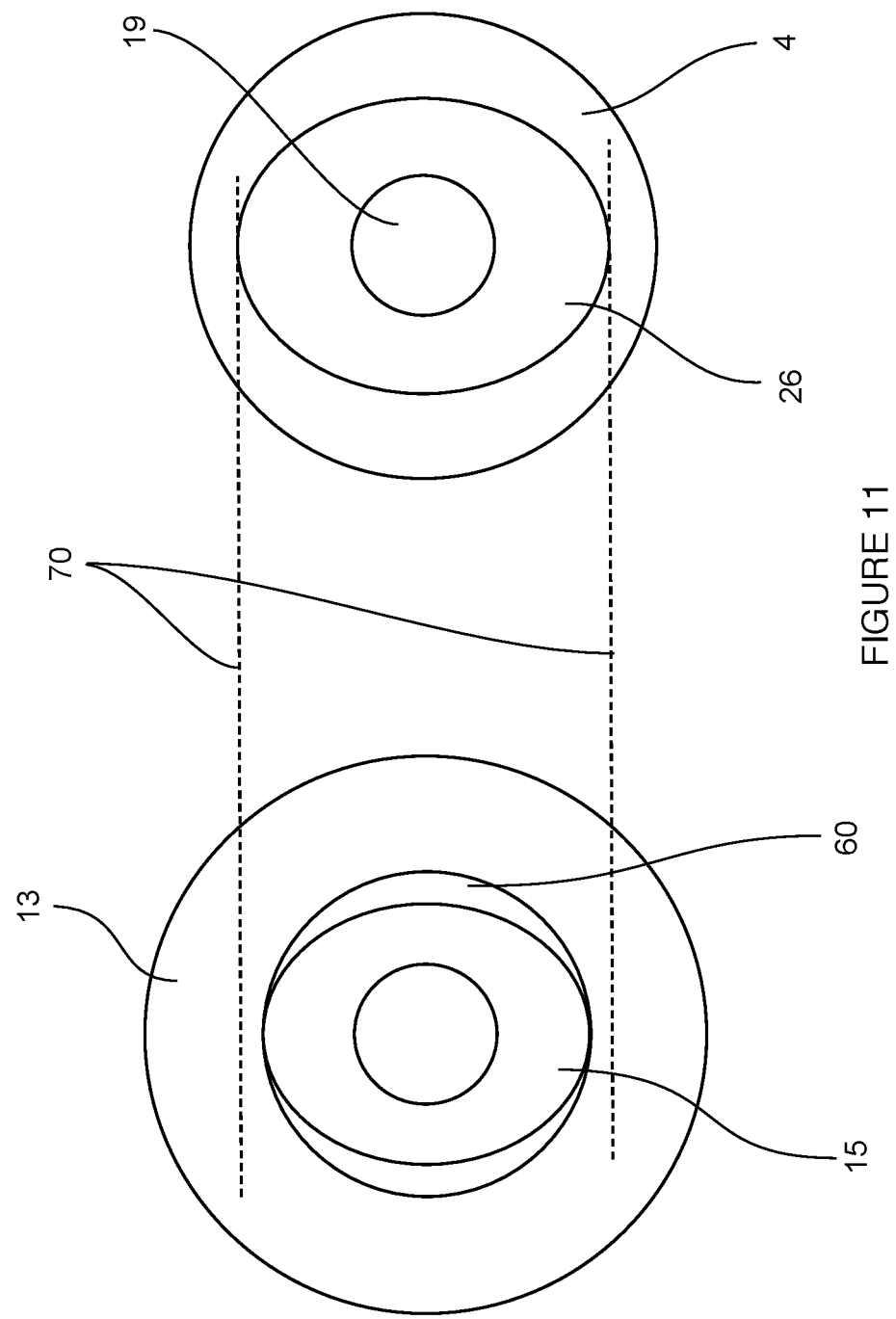
FIG. 11 shows end views of a core and a spindle nut for an embodiment of a sliding nonrotating joint.
Figure 12:
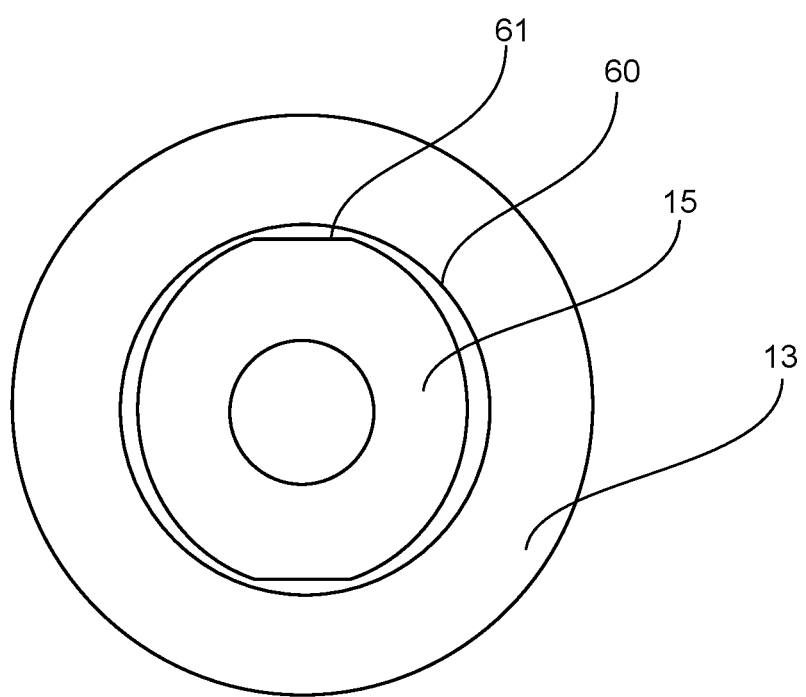
FIG. 12 shows an end view of a core with footing for an embodiment of a sliding nonrotating joint.

In one embodiment of interfering portions of spindle nut 4 and core 15, spindle nut 4 can include one or more splines, sockets, recesses, protrusions, and/or one side of corresponding parts which interact with one or more corresponding splines, sockets, recesses, protrusions and/or other side of corresponding parts to limit or prevent relative rotation of spindle nut 4 and core 15. FIG. 9 shows an embodiment of a sliding nonrotating joint utilizing splines 59. In various embodiments, different number of splines can be used such as 1, 2, 3, 4, 5, 6, 7, 8 more. In some embodiments, the splines can have be sufficiently numerous and positioned to resemble a gear. In some embodiments, individual splines can be square, rectangular, triangular (e.g. pointed) or some other shape or combination of shapes. In some embodiments, the splines can be spaced at regular or irregular intervals. In some embodiments, the corresponding parts can include noncircular portions or can provide interfering features or can include one or more shapes that provide interfering features such as protrusions, such as splines, or ovalized shapes, shapes including flat surfaces, polygons, arcs with intervening flat surfaces or multifaceted shapes. FIG. 10 shows an embodiment of a sliding nonrotating joint 55 having flat surfaces 61 which extend over a portion of the core 15 and has a transition to round 62 as in the area of the base of core 60 proximate the footing 13. FIG. 11 shows end views of the core 15 and spindle nut 4 for an ovalized interfering shape. In FIG. 11, reference lines 70 are provided to demonstrate a difference in size (not to scale) of the core 15 and the hollow 26 in the spindle nut 4. FIG. 12 shows an end view of core 15 for an embodiment of a core with flat surfaces 61 where two equally spaced flat surfaces 61 are provided, but more or fewer flat surfaces, such as 1, 3, 4, 5, 6 7, 8, 9, 10, 11, 12 or more can be provided and the flat surfaces can be equally or unequally spaced and the flat surfaces can be separated by arcs or corners. In some embodiments, the flat surfaces can form a polygon such as a triangle, square, rectangle, rhombus, parallelogram, pentagon, hexagon, septagon, octagon, nonagon, decagon, hendecagon, dodecagon or the like.

In some embodiments, the core 15 can include interfering portions on the end which contacts the spindle nut 4 and/or the core 15 can include interfering portions along a portion of the body of the core extending from a location proximate the spindle nut 4 to a location proximate the footing 13. In some embodiments, the core can include splines along the body of core 15 or one or more of protrusions, crenellations, tabs or pins on the end of core 15 and spindle nut 4 can have corresponding splines, recesses or holes located within a hollow 26 of spindle nut 4. In some embodiment, core 15 can include a portion of the body which is circular with flat portions or which is ovalized or has some other non-circular cross-section which corresponds to a shape in the hollow 26 of spindle nut 4 to limit or prevent relative rotation. In some embodiments, the spindle nut 4 can have an extension which fits into an opening in the core, and the extension can include splines, recesses, protrusions, crenellations, tabs or pins along a length of the extension or on an end of the extension which correspond to splines, recesses or holes in the opening of the core to prevent relative rotation of the spindle nut 4 and core 15. In some embodiments, the extension can have a shape that includes a portion that is circular with flat portions or which is ovalized or has some other non-circular cross-section, such as those discussed above for the spindle nut, which corresponds to a shape in the opening of spindle nut 4 to limit or prevent relative rotation. In some embodiments, the opening can be an opening in which the spindle 3 is present. In some embodiments, the opening can be an opening formed on the exterior of the body of core 15, such as be addition of a sleeve, extensions or protrusions onto the body of core 15.

Additional features that can be present on core 15 and spindle nut 4 can include through holes, channels, passages and like which facilitate filling of the piston with a fluid which actuates the brakes (e.g. brake fluid, hydraulic oil, gas, air and the like) and can also allow the purging of unwanted gases or liquids from the piston. Such functionality can be especially helpful to allow the venting or "bleeding" of air from the brakes when brake fluid or hydraulic oil is used. In addition, such functionality can be especially helpful to allow draining of fluids when gas or air is used to actuate the brakes.

Through holes can be provided at various locations on the core body including at a high point, a low point, or an intermediate point. Channels can be included at various locations, such as at the end of core 15 proximate spindle nut 4 to provide a passage between an opening in the central portion of the core 15 to the internal cavity 2 of the piston body 12. Additional locations for channels include on a surface of the hollow 26 of the spindle nut 4 to provide a passage between the central portion of core 15 to the internal cavity 2 of this body 12, as well as along the splines or along the corresponding features of the spindle nut 4 and core 15. In some embodiments, a passage can be provided by over sizing or under sizing one of the corresponding parts or a portion of one of the corresponding parts such as by using a larger diameter, a smaller diameter, etc. Passages can also be provided between the spindle nut 4 and the inner surface 24 of piston body 12. In addition, when anti-rotation features are provided between the spindle nut 4 and core 15, the entire spindle nut 4 can be sized to be smaller than the inner diameter of piston body 12 to more freely allow the movement of gases and liquids around spindle that 4 and through the piston.

In some embodiments, core 15 can comprise a single piece or two or more pieces. When two or more pieces are used for core 15, they can have interlocking features or otherwise have features to prevent relative rotation between the two or more parts. In some embodiments, a channel, hole, or passage can be provided at the junction between two pieces of core 15. In one embodiment, such as when interlocking crenellations or teeth are provided, one or more of the crenellations or teeth can be missing to provide a channel or additional slots or grooves can be made to provide a channel.

Construction of Footing and Core

In some embodiments, the footing 13 and core 15 can be made as a single piece, such as by molding, forging, punching, spinning or casting as well as other suitable methods for fabricating parts of the desired complexity from the selected material/materials. In some embodiments, the footing 13 can be made separate from core 15 and then attached to one another. Suitable methods of attachment include welding, gluing, soldering, cementing, brazing, threading, clipping, as well as other methods of attachment suitable for the materials being joined and the forces being resisted.

In one embodiment, footing 13 can be made from a blank of circular material or material of another suitable shape which is then punched or coined into a desired final or intermediate shape. Core 15 can be a tubular material or be made from a tubular material which is welded or spin welded into position on footing 13. In some embodiments, core 15 will fit into a socket or fit into a whole in footing 13 for attachment.

In some embodiments, core 15 and footing 13 can be assembled by passing core 15 through the footing and core 15 being affixed to the footing 13. In some such embodiments, the portion of the core 15 extending through footing 13 can also form at least a portion of the face of footing 13 proximate inner brake pad 6. In some such embodiments, the portion of core 15 passing through footing 13 can form at least a portion or all of the face of footing 13 which contacts inner brake pad 6 or contacts the intervening structure between the footing 13 and inner brake pad 6. In some embodiments, the portion of the core 15 extending through footing 13 can form one or more anti-rotation lugs or recesses 50.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

CONCEPTS

Concepts related to this disclosure are shown below:
Concept 1. A disk brake piston comprising:
  a spindle nut; and
  a load bearing column within a piston body, the load bearing column comprising:
    a footing configured to push against a brake pad; and
    a core extending from the metal footing and slidably located within the piston body;
  wherein the spindle nut is configured to contact and push the metal core which pushes the metal footing which pushes on the brake pad.
Concept 2. The disk brake piston of Concept 1, wherein the piston body is of a different material from the load bearing column and the spindle nut.
Concept 3. The disk brake piston of Concept 2, wherein the piston body material is a phenolic polymer.
Concept 4. The disk brake piston of Concept 2 wherein the load bearing column material and the spindle nut material are metals.
Concept 5. The disk brake piston of Concept 4, wherein the load bearing column and the spindle nut are steels.
Concept 6. The disk brake piston of Concept 1, wherein the spindle nut comprises an outer perimeter surface having a first shape and the piston body comprises an inner surface that contacts the outer perimeter surface of the spindle nut and the inner surface has a second shape that is complementary to the first shape and, prevents relative rotation of the spindle nut to the piston body.
Concept 7. The disk brake piston of Concept 1, further comprising a spindle, the spindle comprising an elongate structure having external threads, wherein the external threads threadably engage an opening in the spindle nut, and upon rotation of the spindle, the spindle nut moves laterally to push on an end of the core.

Concept 8. The disk brake piston of Concept 1, wherein the piston body comprises:
a first zone and a second zone, the first zone being proximate the footing and the second zone being distal the footing, wherein,
the first zone comprises:
a central bore including an o-ring groove, wherein an o-ring is present in the o-ring groove and sealingly contacts the core and the piston body, and
the second zone comprises a second central bore, the second central bore having a larger diameter than the central bore, and the second central bore having an internal surface with a first shape, the spindle nut having an outer surface complementary to the first shape so as to prevent relative rotation of the spindle to the piston body.

Concept 9. The disk brake piston of Concept 8, further comprising a retainer, the retainer being attached to a portion of the core extending into the second zone.

Concept 10. The disk brake piston of Concept 1, wherein when the spindle nut pushes on the metal core, a first lateral force is applied to the metal core and is greater than a lateral force applied to the piston body by the spindle nut in the direction of the first lateral force.

Concept 11. The disk brake piston of Concept 1, wherein the footing pushes on the brake pad through an intervening material.

Concept 12. The disk brake piston of Concept 6, wherein the first shape is circular with two opposed flat portions and the second shape is a shape with flat portions that correspond to the flat portions of the first shape.

Concept 13. The disk brake piston of Concept 1, wherein the spindle nut comprises a hollow in an end which contacts the core such that the hollow aligns the core and the nut.

Concept 14. The disk brake piston of Concept 13, wherein the hollow is conically shaped.

Concept 15. The disk brake piston of Concept 14, wherein the core contacts the hollow at a location between a peak of the conical shape and a base of the conical shape.

Concept 16. The disk brake piston of Concept 14, wherein the core is connected to the spindle nut through a sliding non-rotating joint.

Concept 17. A method of using the brake piston of Concept 1 comprising:
rotating a spindle threadably engaging the spindle nut, whereupon the spindle nut pushes on the load bearing column and the load bearing column pushes on a brake pad.

Concept 18. The method of Concept 17, wherein the spindle nut pushes on the load bearing column with a first lateral force that is greater than a lateral force applied to the piston body by the spindle nut in the direction of the first lateral force.

Concept 19. A disk brake piston comprising:
a body;
a metal spindle;
a metal spindle nut located within the body, the spindle nut contacting an interior surface of the body and having a shape complementary to a shape of the interior surface so as to prevent relative rotation of the spindle nut in relation to the body;
a metal face insert,
wherein the metal face insert comprises a metal footing and a metal core, wherein the metal footing has a first face configured proximate a first end of the body and a second face opposite the first face and the metal core extends from a central portion of the first face of the metal footing and into an opening in the body,
the metal core having an end distal the metal footing configured to contact the metal spindle nut and the metal spindle nut having an elongate portion threadably engaging the spindle nut,
wherein rotation of the spindle in a first direction pushes the nut against the end of the metal footing.

Concept 20. A disk brake piston comprising:
a spindle nut; and
a load bearing metal column within a piston body, the load bearing metal column comprising:
a metal footing; and
a metal core extending from the metal footing and slidably located within the piston body;
wherein during operation of a parking brake, the spindle nut contacts and pushes the metal core which pushes the metal footing which pushes on a brake pad.

Concept 21. A disk brake piston comprising:
a spindle nut; and
a load bearing column within a piston body, the load bearing metal column comprising:
a footing; and
a core extending from the metal footing and slidably located within the piston body;
wherein during operation of a parking brake, the spindle nut contacts and pushes the metal core which pushes the metal footing which pushes on a brake pad.

The invention claimed is:
1. A disk brake piston comprising:
a spindle nut; and
a load bearing column within a piston body, the load bearing column comprising:
a footing configured to push against a brake pad; and
a core extending from the metal footing and slidably located within the piston body;
wherein the spindle nut is configured to contact and push the metal core which pushes the metal footing which pushes on the brake pad.

2. The disk brake piston of claim 1, wherein the piston body is of a different material from the load bearing column and the spindle nut.

3. The disk brake piston of claim 2, wherein the piston body material is a phenolic polymer.

4. The disk brake piston of claim 2 wherein the load bearing column material and the spindle nut material are metals.

5. The disk brake piston of claim 4, wherein the load bearing column and the spindle nut are steels.

6. The disk brake piston of claim 1, wherein the spindle nut comprises an outer perimeter surface having a first shape and the piston body comprises an inner surface that contacts the outer perimeter surface of the spindle nut and the inner surface has a second shape that is complementary to the first shape and, prevents relative rotation of the spindle nut to the piston body.

7. The disk brake piston of claim 1, further comprising a spindle, the spindle comprising an elongate structure having external threads, wherein the external threads threadably engage an opening in the spindle nut, and upon rotation of the spindle, the spindle nut moves laterally to push on an end of the core.

8. The disk brake piston of claim 1, wherein the piston body comprises:

a first zone and a second zone, the first zone being proximate the footing and the second zone being distal the footing, wherein, the first zone comprises:
a central bore including an o-ring groove, wherein an o-ring is present in the o-ring groove and sealingly contacts the core and the piston body, and the second zone comprises a second central bore, the second central bore having a larger diameter than the central bore, and the second central bore having an internal surface with a first shape, the spindle nut having an outer surface complementary to the first shape so as to prevent relative rotation of the spindle to the piston body.

9. The disk brake piston of claim 8, further comprising a retainer, the retainer being attached to a portion of the core extending into the second zone.

10. The disk brake piston of claim 1, wherein when the spindle nut pushes on the metal core, a first lateral force is applied to the metal core and is greater than a lateral force applied to the piston body by the spindle nut in the direction of the first lateral force.

11. The disk brake piston of claim 1, wherein the footing pushes on the brake pad through an intervening material.

12. The disk brake piston of claim 6, wherein the first shape is circular with two opposed flat portions and the second shape is a shape with flat portions that correspond to the flat portions of the first shape.

13. The disk brake piston of claim 1, wherein the spindle nut comprises a hollow in an end which contacts the core such that the hollow aligns the core and the nut.

14. The disk brake piston of claim 13, wherein the hollow is conically shaped.

15. The disk brake piston of claim 14, wherein the core contacts the hollow at a location between a peak of the conical shape and a base of the conical shape.

16. The disk brake piston of claim 14, wherein the core is connected to the spindle nut through a sliding non-rotating joint.

17. A method of using the brake piston of claim 1 comprising:
rotating a spindle threadably engaging the spindle nut, whereupon the spindle nut pushes on the load bearing column and the load bearing column pushes on a brake pad.

18. The method of claim 17, wherein the spindle nut pushes on the load bearing column with a first lateral force that is greater than a lateral force applied to the piston body by the spindle nut in the direction of the first lateral force.

* * * * *